United States Patent [19]
Kubota

[11] Patent Number: 6,109,382
[45] Date of Patent: Aug. 29, 2000

[54] SNOWMOBILE DRIVE BELT SUSPENSION

[75] Inventor: Takahiko Kubota, Iwata, Japan

[73] Assignee: Yamaha Hatsudoki Kabushiki Kaisha, Iwata, Japan

[21] Appl. No.: 08/939,139

[22] Filed: Sep. 29, 1997

[30]     Foreign Application Priority Data

Sep. 27, 1996  [JP]  Japan .................................. 8-255826

[51] Int. Cl.⁷ .................................................. B62M 27/02
[52] U.S. Cl. ........................... 180/190; 180/193; 305/141
[58] Field of Search ..................................... 180/190, 186, 180/192, 193, 6.7, 9.1, 9.5, 9.54, 9.56, 9.58; 305/21, 46, 141, 124, 129

[56]             References Cited

U.S. PATENT DOCUMENTS 2,858,171  10/1958  Senkowski et al. .
4,068,732   1/1978  Granryd .

*Primary Examiner*—Christopher P. Schwartz
*Assistant Examiner*—C. T. Bartz
*Attorney, Agent, or Firm*—Knobbe, Martens, Olson & Bear LLP

[57]              ABSTRACT

A snowmobile and more particularly to an improved suspension arrangement for a snowmobile that provides an elastic stop for limiting the movement of the drive belt upwardly relative to the frame assembly and which operates independently of the cushioning units so as to avoid undue loading and wear of them

10 Claims, 8 Drawing Sheets

SNOWMOBILE DRIVE BELT SUSPENSION

BACKGROUND OF THE INVENTION

This invention relates a snowmobile and more particularly to an improved drive belt suspension arrangement for a snowmobile.

As is well known, snowmobiles and particularly the larger versions, have a relatively large drive belt that extends beneath the lower rearward most portion of the snowmobile for driving the snowmobile along the terrain over which it travels. Generally, these drive belts suspend the vehicle body relative to the drive belt for suspension movement. Generally, the drive belt rides over one or more guide rails and those guide rails are suspended relative to the vehicle body by a suspension system.

Often times the suspension system includes front and rear suspension units that support the front and rear ends of the guide rails for their movement. At times, the suspension units may be inter-linked together for simultaneous movement after a certain degree of travel.

This type of suspension system, although widely used, has some disadvantages. First, it is obviously necessary to provide an arrangement that limits the degree of maximum movement of the drive belt relative to the snowmobile body in each direction. Generally, a strap-type drop down arrangement is provided for limiting the amount that the drive belt may drop relative to the body. This type of motion frequently occurs when traveling over a hill or mogul and wherein the vehicle body may actually become airborne. Under this condition, there is relatively low loading and frequently straps are employed for controlling the maximum degree of drop down.

On the other hand, when encountering bumps more severe loading can occur. Generally, it is the practice to utilize some form of stopper arrangement in the suspension element so as to limit the degree of upward movement of the drive belt relative to the snowmobile body. This type of stop arrangement has a number of disadvantages. First, it places fairly large loading on the suspension elements and particularly on the piston rod of the shock absorber associated with the suspension element. This can cause damage. Furthermore, it is difficult to provide adjustment of the suspension element and maintain the desired stopper relationship.

It is, therefore, a principal object of this invention to provide an improved drive belt arrangement for a snowmobile and more particularly to a suspension system therefore.

It is a further object of this invention to provide an improved stop mechanism for limiting the degree of upward travel of the drive belt relative to the snowmobile body which operates independently of the cushioning elements of the suspension unit.

It is a further object of this invention to provide an improved and simplified stopper arrangement for controlling the movement of the drive belt relative to the snowmobile body.

SUMMARY OF THE INVENTION

This invention relates to a snowmobile comprised of a body assembly, a drive belt, an engine transmission assembly for driving the drive belt and a suspension system for suspending the drive belt for suspension movement relative to the frame assembly. The suspension system includes at least one guide rail that is associated with the backup side of the drive belt and which assists in maintaining the drive belt in driving contact with the terrain over which the vehicle travels. In addition, a suspension system is provided that includes a linkage assembly for suspending the guide rail for suspension movement relative to the frame assembly and a cushioning unit for cushioning this suspension movement. An elastic stop is interposed between the guide rail and the frame assembly for elastically limiting their relative movement in at least one direction. This elastic stop is independent from the cushioning unit.

DETAILED DESCRIPTION OF THE PREFERRED EMBODIMENT OF THE INVENTION

Figure 1:
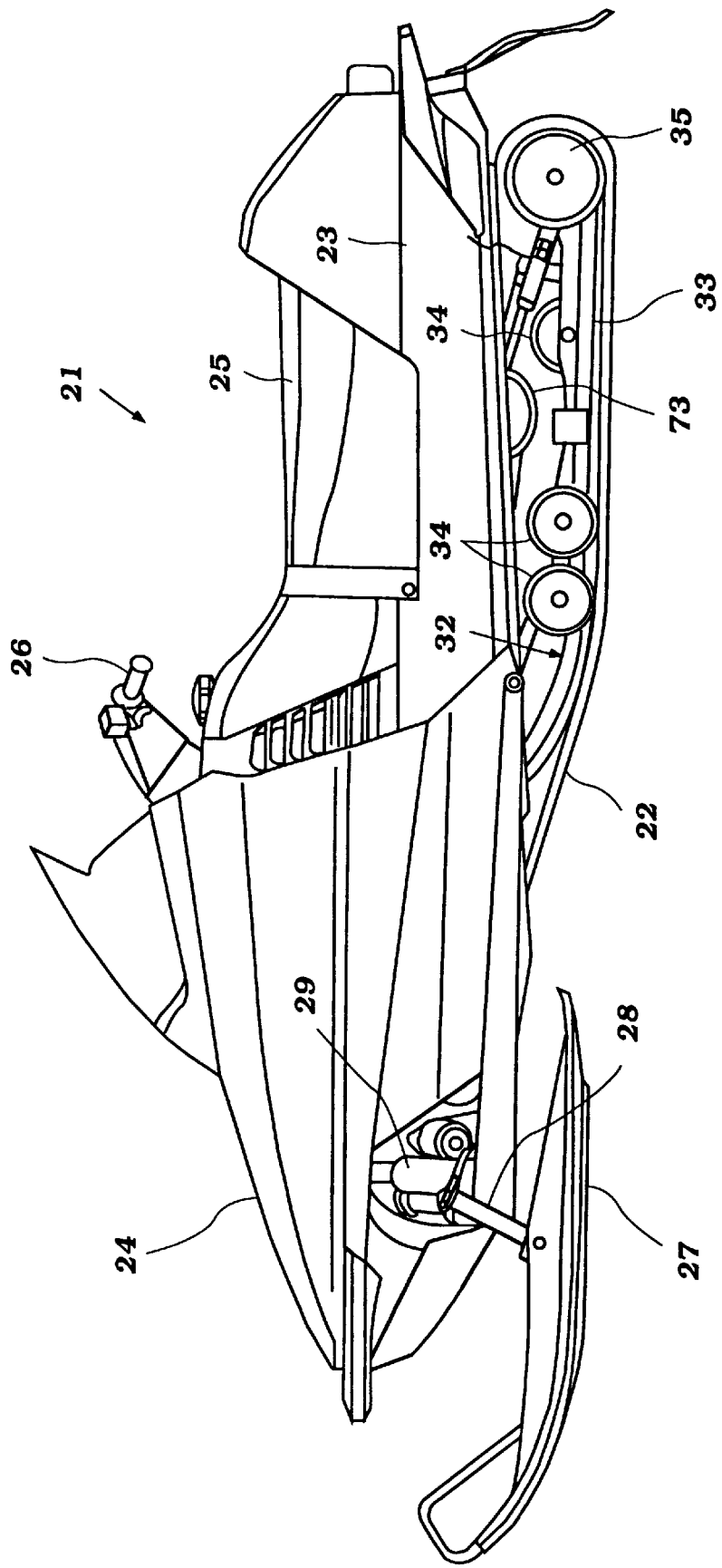
FIG. 1 is a side elevational view of a snowmobile constructed in accordance with a preferred embodiment of the invention, with the snowmobile shown in a normally loaded condition.
Figure 2:
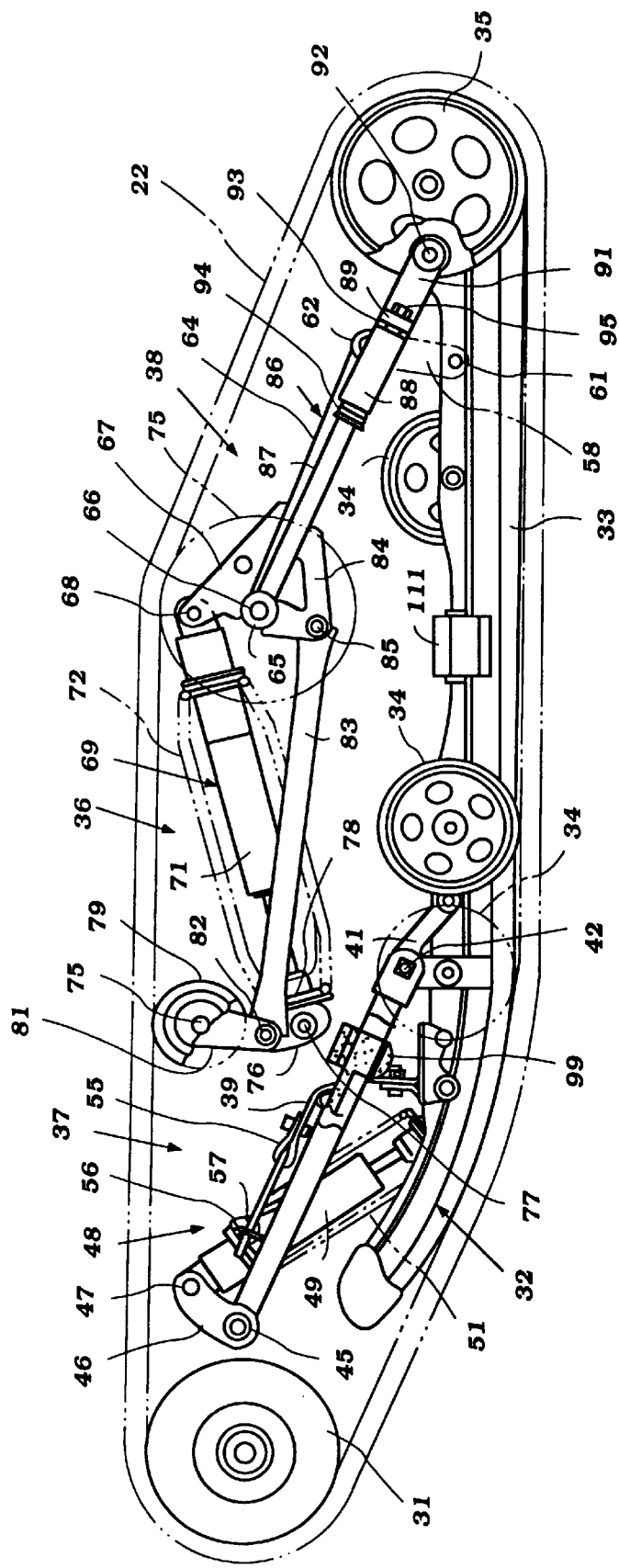
FIG. 2 is an enlarged side elevational view showing the suspension mechanism for the drive belt, with the drive belt being shown in phantom and in the same loaded condition as FIG. 1.
Figure 3:
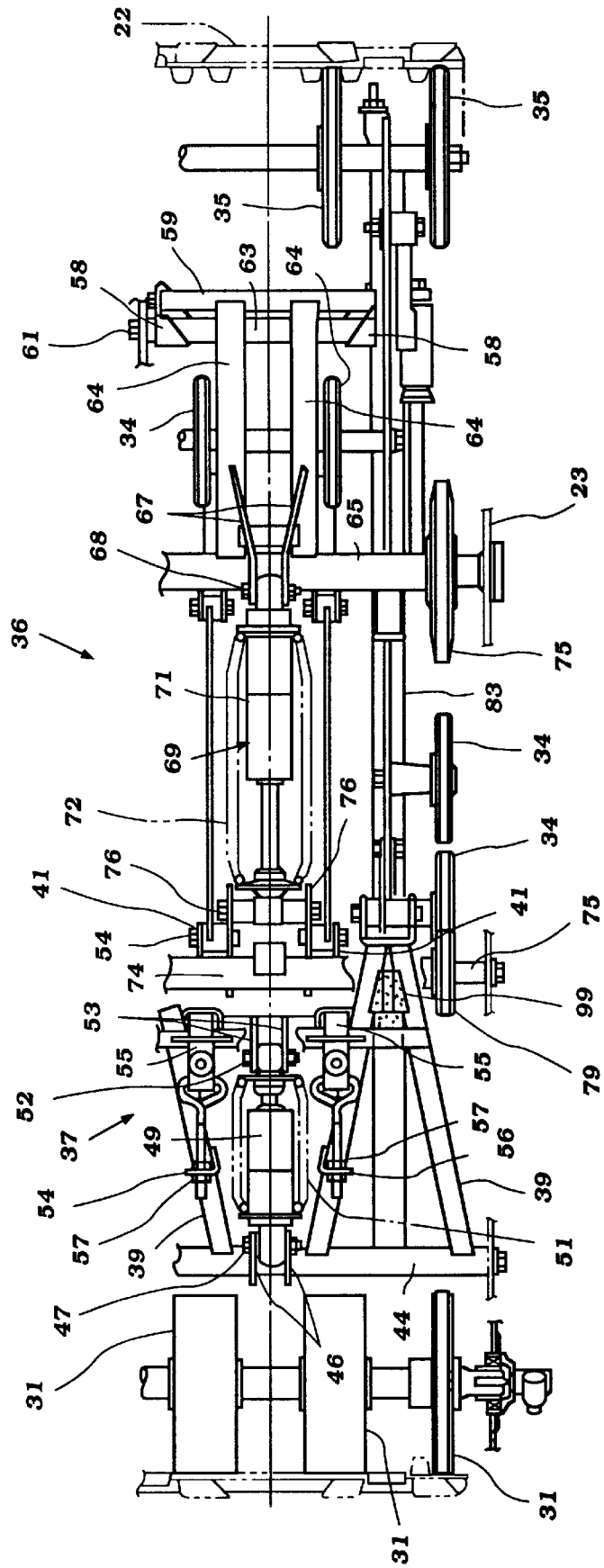
FIG. 3 is a top plan view of the drive belt suspension mechanism, with the drive belt being shown partially in phantom.

Referring now in detail to the drawings and initially to FIGS. 1–3 and initially primarily to FIG. 1, a snowmobile constructed in accordance with a preferred embodiment of the invention is identified generally by the reference numeral 21. Since the invention deals primarily with the suspension for the drive belt, indicated generally by the reference numeral 22, the overall construction of the snowmobile 21 will be described only generally. Where any components of the snowmobile 21 are not described in detail or not illustrated, reference may be had to any known prior art construction for such missing details.

The snowmobile 21 includes a frame assembly, indicated generally by the reference numeral 23, which consists primarily of a pair of side frame members that are formed from sheet metal or the like. A body 24 covers the forward portion of the snowmobile and a major portion of the rear part thereof A seat 25 is disposed behind a control handlebar assembly 26 for operation of the snowmobile 21 by a rider seated on the seat 25.

A pair of front skis 27 are journaled by respective ski suspension units 28 that include strut-type dampers 29. This front suspension permits steering movement of the front skis 27 in a known manner. This steering movement is controlled by the handlebar assembly 26.

Contained within the interior of the front portion of the body 24 is an internal combustion engine of any known type which drive a transmission. The transmission may be of the continuously variable type and can include a centrifugal clutch for driving the drive belt 22.

The drive belt 22 and its suspension system will now be described in more detail by reference additionally to FIGS. 2–9 but referring first primarily to FIGS. 2 and 3. As with the prior art type of construction, a driving sprocket assembly 31 is journaled upon the frame assembly 23 in a known manner and is driven through the aforenoted engine/transmission combination. The sprocket 31 is engaged with the backside of the drive belt 22 and drives it through a suitable and known type of cog mechanism.

A guide rail assembly, indicated generally by the reference numeral 32, comprised of a pair of spaced apart but interconnected guide rails 33 cooperates with and engages the backside of the drive belt 22. This guide rail assembly 32 journals a plurality of backup rollers 34 and a larger idler roller 35 mounted at the rear end of the guide rail assembly 32. The guide rail assembly 32 is supported for suspension movement relative to the frame assembly 23 by a suspension system, indicated generally by the reference numeral 36. This suspension assembly 36 includes a front suspension unit 37 and a rear suspension unit 38.

Figure 4:
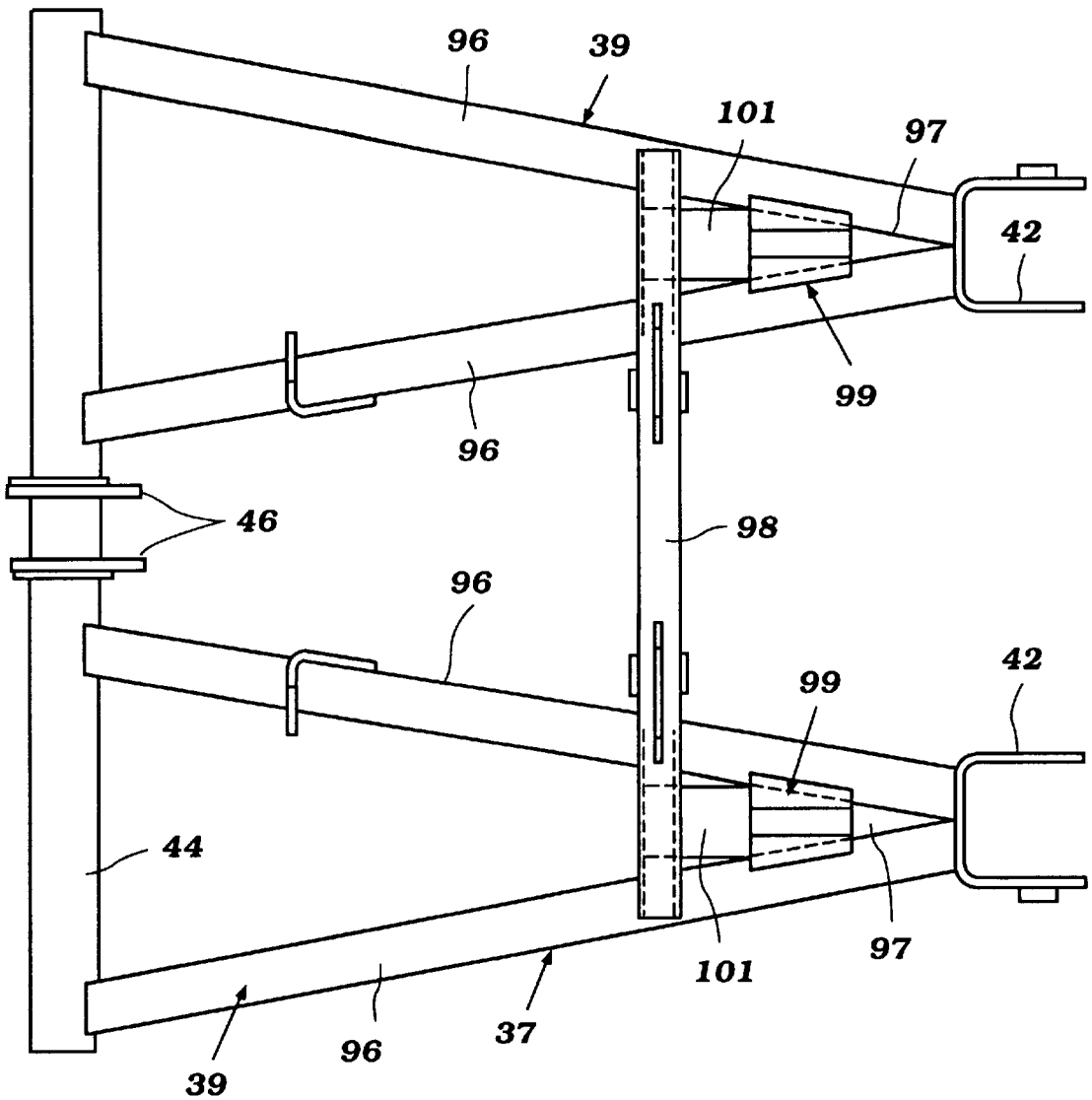
FIG. 4 is an enlarged top plan view showing one of the suspension elements and its association with the stopper mechanism that is carried by it.
Figure 5:
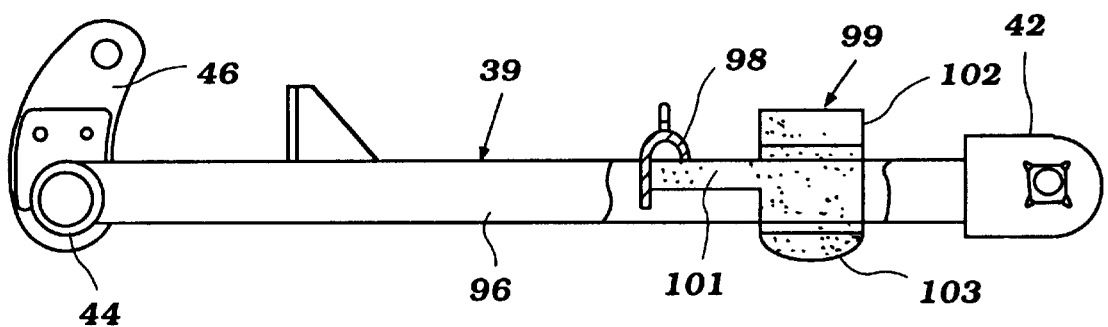
FIG. 5 is an enlarged side elevational view of the assembly shown in FIG. 4.
Figure 6:
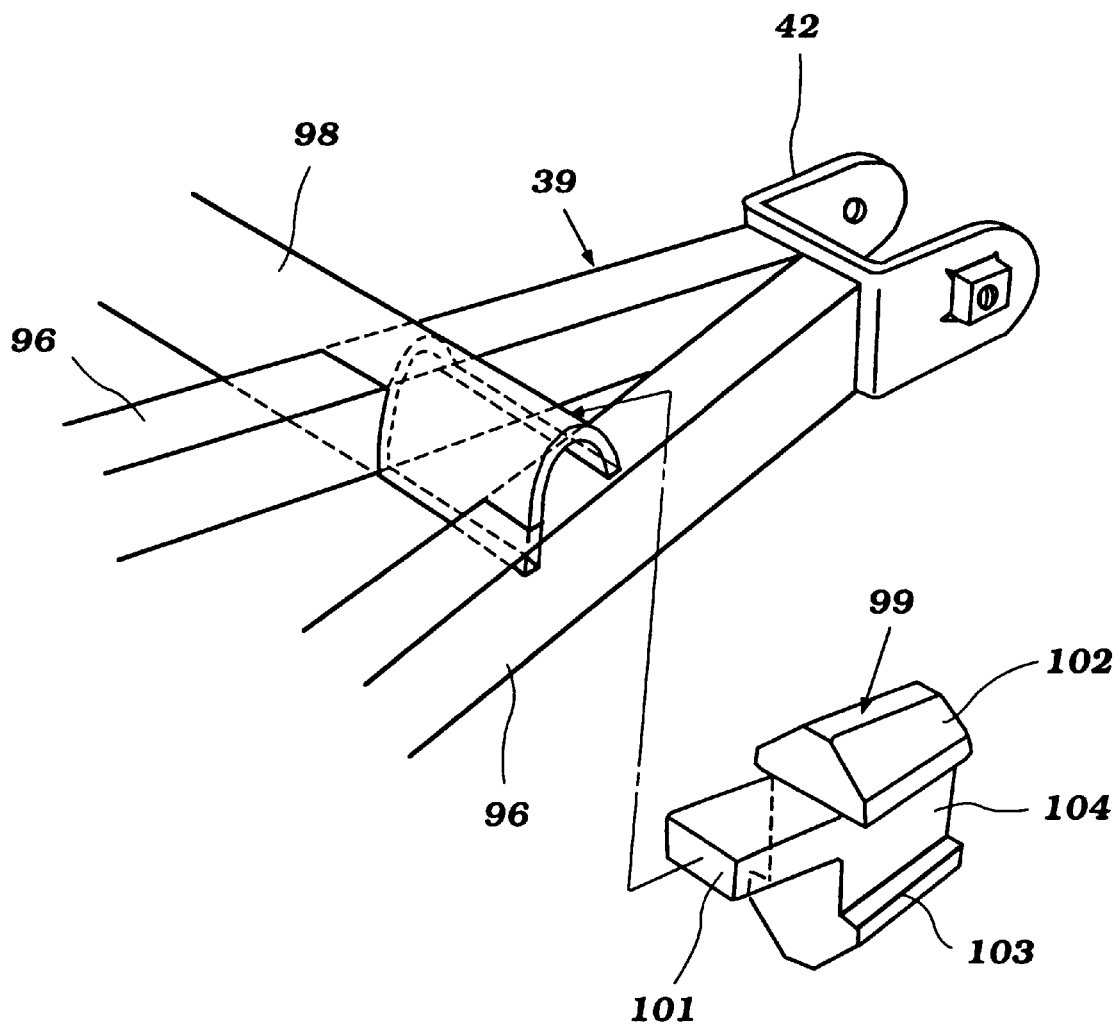
FIG. 6 is a further enlarged, exploded, perspective view showing how the stopper element is inserted.

The front suspension unit is comprised of a pair of lever arms 39 positioned at opposite sides of the guide rail assembly 32, and cooperating with brackets 41 formed on each of the side plates 33. These lever arms 39 are, as best seen in FIGS. 4 and 5, of a triangular built-up configuration and carry trunions 42 at their lower ends, which are connected by pivot pins 43 to the respective brackets 41. The upper ends of these triangular lever arms 39 are connected, as by welding, to a cross-tube 44. This cross-tube 44 is, in turn, pivotally supported on the side rails of the frame assembly 23 by means of a pivot shaft 45.

A bracket 46 is affixed by welding to the tubular member 44 and provides a pivotal connection, as at 47, to one end of a combined spring and cushioning unit, indicated generally by the reference numeral 48. The cushioning unit 48 is comprised of a telescopic shock absorber 49 and a surrounding coil compression spring 51.

The lower end of this cushioning unit 48 is connected by means of a pivot pin 52 to a pair of brackets 53 which are, in turn, affixed to a further shaft 54 that is journaled on the forward portion of the guide rails 32. This shaft 54 is disposed forwardly of the pivot shaft 42.

Thus, when the forward portion of the drive track 22 engages an obstacle, the guide track 32 leading end will be forced upwardly. This upward movement will cause the lever arms 39 to pivot in a counterclockwise direction around the pivot shaft 45. This movement creates an upward force on the cushioning unit 48. At the same time, the upward movement of the pivot pin 52 will move the upper end of the cushioning unit 48 also upwardly. The relative movement is such, however, that there is an overall relative movement between the ends of the cushioning unit 48 which provides a resilient damping to the upward movement of the guide rail 32.

A pair of drop-down control straps 55 is connected at one end to the shaft 54. The other end of these drop-down straps 55 are connected to an adjusting bracket 56 which is adjustable connected at 57 to the lever arms 39. This strap 55 will control how far the front of the guide rail 32 can drop down if the vehicle takes a jump, and also will limit the maximum extension of the cushioning unit 48. By attaching the strap 56 to the arms 39, it is possible to obtain a finer degree of adjustment with less overall movement than if the strap 56 were connected to the frame 23, as with prior construction. Also, the adjustment 57 is disposed where it is well above the level of the guide rail 32 and thus above the snow line.

The degree of upward movement is controlled in a manner that will be described by reference to FIGS. 4 through 9 later.

Referring now to the rear suspension system 38, this includes a pair of links 58 which are connected to the ends of a tubular member 59 that spans the rail sides 33 and which is pivotally connected thereto by a pivot shaft 61. The upper ends of the links 58 are connected to a shaft 62 that is journalled in a tubular shaft 63. This tubular shaft 63 provides a pivotal connection to a pair of levers 64 that are affixed as by welding to it. The levers 64, in turn, extend upwardly and are affixed to a further tubular shaft 65. The tubular shaft 65 is journalled on the frame rails 23 by means of a pivot shaft 66.

A bell crank assembly 67 is affixed to the levers 64 and tubular shaft 65. This bell crank assembly 67 has a pivotal connection at 68 to one end of a second cushioning unit, indicated generally by the referenced numeral 69. The cushioning unit 69, like the cushioning unit 48, is comprised of a tubular shock absorber 71 and a surrounding coil compression spring 72. Hence, upon upward movement of the rearward portions of the guide rail 32 and rearward portion of the drive belt 22, the links 58 and 64 will effect rotation of the tubular shaft 65 and movement of the bell crank 67 so as to move the pivot pin 68 in an arc to load one end of the cushioning unit 69.

It should also be noted that the tubular member 65 also journals a further pair of idler rollers 73 which are in engaged with the drive belt 22 and specifically the return flight side thereof The opposite end of the cushioning unit 69 is suspended from the frame assembly by a mechanism that is best shown in FIGS. 2 and 3. This mechanism includes a tubular member 74 that is journalled on the frame assembly 23 on a pivot shaft 75. A pair of inner lever arms 76 are affixed to the tubular member 74 and extend downwardly to receive a pivot bolt 77. The cushioning unit 69 has a trunion portion 78 that is journalled on the pivot bolt 77 between the arms 76.

The tubular member 74 also journals a pair of idler rollers 79 which are engaged with the backside of the return flight of the drive belt 22.

Affixed to the tubular member 74 axially outwardly of the lever arm 76 is a second pair of lever arms 81 which are shorter in length than the lever arms 76. These shorter lever arms 81 are connected also to an intermediate portion of the lever arm 76 by means of bolts 82. The bolts 82 also provide a pivotal connection to one end of a respective tie link 83. The opposite ends of the tie links 83 are connected to a further arm portion 84 of the bell crank 67 by means of pivot pins 85.

As a result of this construction, when the guide rail 32 moves upwardly or downwardly, one end of the second cushioning unit 69 will be moved in a first direction and the opposite end will be moved in the opposite direction so as to magnify the degree of compression or expansion of the cushioning unit 69 in response to a given degree of suspension travel.

The rear suspension unit 38 also includes a mechanism which functions so as to limit the maximum upward and downward movement of the rear portion of the track assembly 32. This mechanism is indicated generally by the reference numeral 86 and has a construction best shown in FIGS. 2 and 3. The mechanism includes a pair of rod-like members 87 that extend upwardly and which are connected to the tubular member 65. The lower ends of these members 87 are slidably received in respective tubular bodies 88. The tubular bodies 88 are, in turn, carried by a semi-cylindrical member 89 which is connected to a tubular portion 91 which is, in turn, pivotally connected to brackets on the guide rails 33 by pivot pins 92.

A stack of first adjusting shims 93 are disposed on one end of the rod 87 and engage one end of the tubular member 88 so as to limit the degree of compression or upward movement. The maximum drop-down is controlled by a second series of shims 94 which engage the other end of the tubular member 88 so as to limit the maximum drop-down distance. A nut 95 permits the shims 93 and 94 to be affixed on the shaft rod 87 so as to adjust the distances to suit rider preference.

The mechanism for limiting the degree of upward movement of the front and mid-section of the guide rail assembly 32 and drive belt 22 relative to the frame assembly 23 will now be described beginning first with that at the front of the guide rail 32 and which is shown best in FIGS. 2–9.

Before describing this structure, however, a more detailed description of the front arms 39 of the front suspension system 38 is in order. It has been noted that these A-arms 39 interconnect the tubular member 44 with the trunions 42. Each A-arm construction is comprised of a pair of rectangular tubes 96 which are spaced apart at their forward ends and which converge in pairs toward an area 97 at the trunions 42. A cross-tube 98 extends across these areas 97 and is affixed to the members 96 as may be readily seen in the figures of the drawings. This tube 98 is actually a semi-circular tube that has a downwardly extending portion and across the top of which the drop down strap 55 extends.

In the areas 97 between the tubular members 96, a pair of elastomeric stops, indicated generally by the reference numeral 99 are provided. These stops have a tongue portion 101 that is received in a recess defined by the tubular members 98 so as to hold the stops 99 in position as best seen in FIG. 5.

Figure 8:
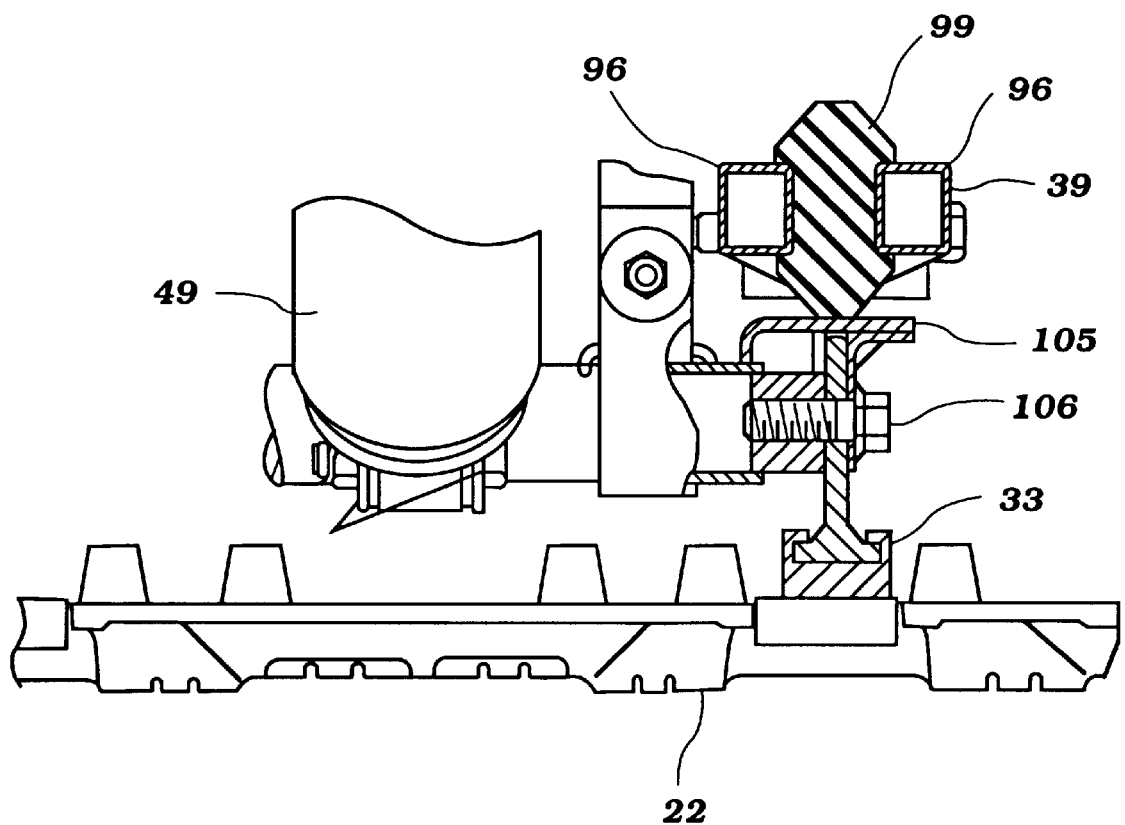
FIG. 8 is a cross-sectional view taken generally along the line 8—8 of FIG. 7.

The rearwardly extending portion of each of the stops 99 is formed with a generally symmetric shape having an upper portion 102 and a lower portion 103 that are connected by a bridging area 104 that is narrower than them and which is trapped between the tubes 96 as seen in FIG. 8.

Also, as will be seen in FIGS. 5 and 7–9, the lower portion 103 extends well below the frame tubes 96 while the portion 102 extends above them. The lower ends of the drop down straps 55 are connected to a cross-bracket 104 which, in turn, is affixed to the guide rail 32 by a fastener 106 Each bracket 104 defines a horizontally extending surface 105 that is juxtaposed to the lower portion of the stop 99.

Figure 7:
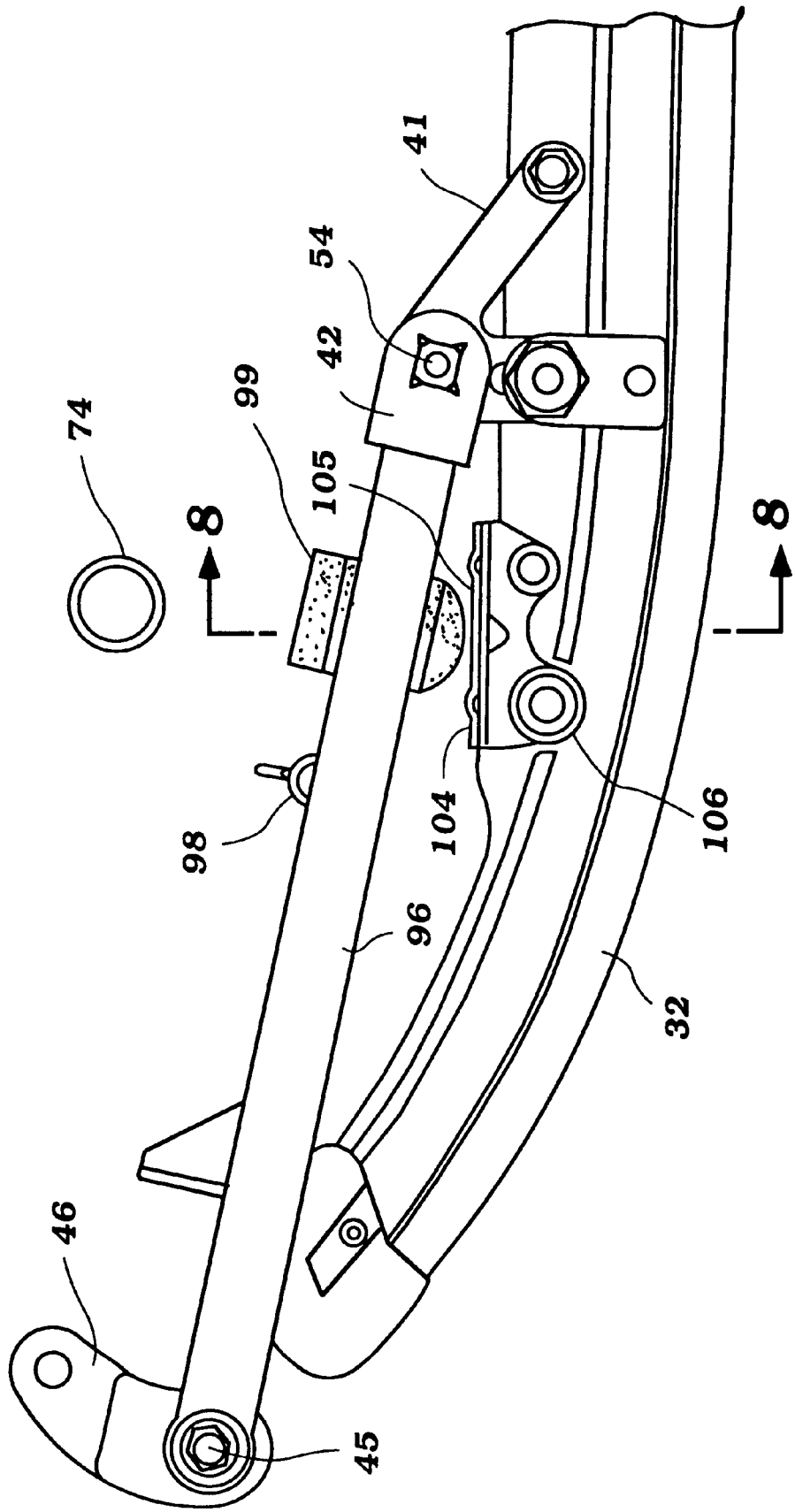
FIG. 7 is an enlarged side elevational view of the front portion of the snowmobile's drive belt suspension system showing only the guide rail, one of the frame tubes and the front suspension unit in a position approaching the uppermost limit of suspension travel.

As may be seen best in FIGS. 7 and 8, as the front end of the suspension deflects, the surface 105 will approach and eventually engage the lower portion 103 of the stop 99. When this occurs, engagement with the link 37 will cause it to move without further pivotal movement relative to the guide rail 33.

Figure 9:
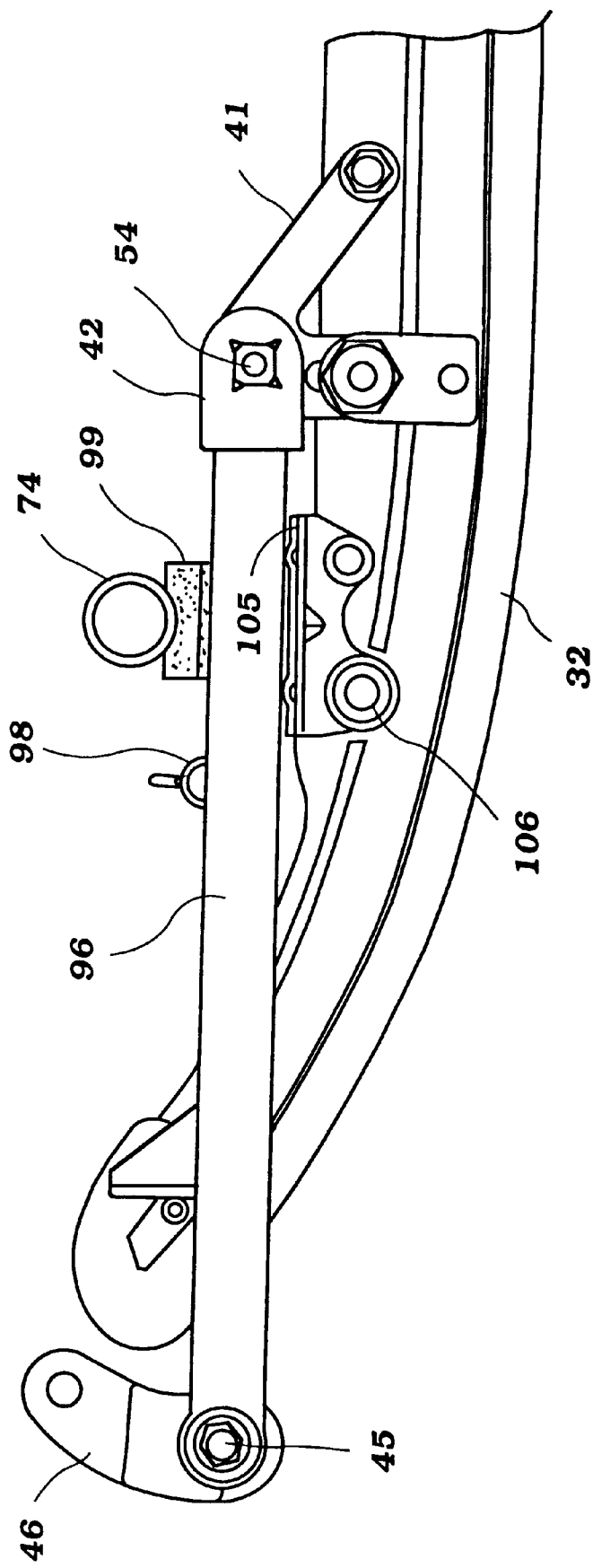
FIG. 9 is a side elevational view, in part similar to FIG. 7, and shows the stopper element when it is functioning to stop the suspension travel.

Upon continued upward movement as shown in FIG. 9, the upper stop surface 102 will then engage the cross-tube 74 and provide an elastic stop for the total degree of upward suspension movement. Thus, the stop is provided directly between the guide rail 32 and the frame assembly 23 and independently of the cushioning units 48 and 69. This will relieve these units of this function and will provide a more positive stop but one which can be elastically absorbed. In addition, the stop members 99 can be easily removed or replaced if they become worn.

Similar stops 111 are affixed to the rear portion of the guide rail parts 93 and cooperate with the tubular member 95 to limit the degree of upward movement of the rearward portion of the guide rail 32.

Thus, the described stop in construction permits a damped but positive limitation on the degree of upward movement of the drive belt 22 relative to the frame assembly and this is done independently of the cushioning units and specifically the shock absorbers 49 and 71.

Of course, the foregoing description is that of preferred embodiments of the invention, and various changes and modifications may be made without departing from the spirit and scope of the invention, as defined by the appended claims.

What is claimed is:

1. A snowmobile comprised of a frame assembly, a drive belt, an engine transmission assembly for driving said drive belt, and a suspension system for suspending said drive belt for suspension movement relative to said frame assembly, said suspension system including at least one guide rail carrying at least front and rear guide rollers associated with the front and rear ends of the back side of said drive belt for maintaining said drive belt in driving contact with the terrain over which said snowmobile travels, a linkage assembly for suspending said guide rail for suspension movement relative to said frame assembly and a cushioning unit for damping the movement of said guide rail relative to said frame assembly upon suspension movement, and an elastic stop operatively interposed between said guide rail and said frame assembly independent from said cushioning unit for elastically limiting their suspension relative movement in at least one direction.

2. A snowmobile as set forth in claim 1, wherein the elastic stop includes a single element engaged on one side by the guide rail and on the other side by the frame assembly for limiting the suspension movement.

3. A snowmobile as set forth in claim 1, wherein the linkage assembly includes a link pivotally connected between the frame assembly and the guide rail and wherein the elastic stop is carried by said link.

4. A snowmobile as set forth in claim 3, wherein the elastic stop includes a single element engaged on one side by the guide rail and on the other side by the frame assembly for limiting the suspension movement.

5. A snowmobile as set forth in claim 1, wherein the guide rail comprises a pair of spaced apart guide rails and there is provided an elastic stop between each of said guide rail and the frame assembly.

6. A snowmobile as set forth in claim 5, wherein each of the elastic stops comprises a single element engaged on one side by the respective guide rail and on the other side by the frame assembly for limiting the suspension movement.

7. A snowmobile as set forth in claim 5, wherein the linkage assembly includes a pair of links each pivotally connected between the frame assembly and the respective guide rail and an elastic stop is carried by each of said links.

8. A snowmobile as set forth in claim 7, wherein each elastic stop comprises a single element engaged on one side by the respective guide rail and on the other side by the frame assembly for limiting the suspension movement.

9. A snowmobile as set forth in claim 7, wherein each of the elastic stops is detachable connected to the respective link.

10. A snowmobile as set forth in claim 9, wherein each of the elastic stops is trapped between a pair of converging side members of the respective link.

* * * * *